Patented Sept. 26, 1950

2,524,020

UNITED STATES PATENT OFFICE 2,524,020

BETA-CHLOROPROPIONIC AND BETA-CHLOROISOBUTYRIC ACID NITRILES

Philip H. Moss, Nederland, Tex., assignor to American Cyanamid Company, New York, N. Y., a corporation of Maine No Drawing. Application October 2, 1948, Serial No. 52,611

7 Claims. (Cl. 260—465.7)

The present invention relates to the preparation of beta-chloropropionitrile and its alpha-alkyl derivatives.

It is an object of the present invention to add gaseous hydrogen chloride to acrylonitrile and/or its alpha-alkyl derivatives in excellent yields by means of an amine or amine salt catalyst.

Stewart and Clark, Journal of the American Chemical Society, vol. 69, page 713 (1947), have demonstrated that hydrogen chloride may be added to acrylonitrile, followed by distillation with an overall yield of 80% of recovered beta-chloropropionitrile.

It has now been found that the overall yield of the beta-chloro derivative may be considerably increased and the reaction time considerably reduced if the addition is carried out in the presence of an amine or amine salt. Both acrylonitrile and its alpha-alkyl derivatives absorb hydrogen chloride in greater amounts in the presence of such a catalyst than in its absence.

In many cases the amine will react with some of the acrylic compound before the hydrogen chloride is added. Such preliminary reaction, however, does not deter the addition of hydrogen chloride to the remainder and may actually provide a more active catalyst. The reactions involved between the acrylic compound and primary amines, and most of the secondary amines, are different from those of the tertiary amines in that the primary amines and most of the secondary amines react with the acrylic compound, such as acrylonitrile, to form (in this particular reaction) cyanoethylated amines according to the equations:

(a) $2\ CH_2=CH-CN + RNH_2 \rightarrow RN(C_2H_4CN)_2$
(b) $CH_2=CH-CN + R_2NH \rightarrow R_2NC_2H_4CN$ Owing to steric hindrance, some secondary amines, such as diisopropylamine, will not react with acrylonitrile to form cyanoethylated derivatives. Tertiary amines also do not form cyanoethylated derivatives owing to the lack of free hydrogen atoms attached to nitrogen. However, regardless of whether the amine or amine salt employed forms an addition compound with the acrylic compound, the catalytic effect is substantial.

The following examples illustrate the invention.

Example 1

Gaseous hydrogen chloride was bubbled into a well-stirred mixture of 2 moles of acrylonitrile and 0.0246 mole of butylamine. The temperature was held in the range of 27°–30° C. by means of a cooling bath and addition of hydrogen chloride was continued for about 3 hours, during which time 69 grams of hydrogen chloride was absorbed by the mixture. The mixture was then distilled under reduced pressure to give an 86.9% yield of beta-chloropropionitrile. Under the same conditions, but omitting the catalyst, the yield was only 59.8%.

Example 2

Under the conditions of Example 1 butylamine hydrochloride was used as the catalyst, with an 88.6% yield of beta-chloropropionitrile.

Example 3

Using the same conditions as in the preceding examples, except that the catalyst was diethylamine hydrochloride, beta-chloropropionitrile in a yield of 86.9% was obtained.

Under similar conditions the use of diisopropylamine resulted in a 90.3% yield, whereas the same catalyst used in the higher temperature range of about 50°–53° C. gave a yield of 88.5%. At the latter temperature a triethylamine catalyst resulted in a yield of 89.1%.

Example 4

Hydrogen chloride was bubbled into a well-stirred mixture of 265 grams (5 moles) of acrylonitrile and 6.2 grams (0.0615 mole) of diisopropylamine held under a reflux condenser. The hydrogen chloride was added at such a rate that it escaped from the reflux condenser. The addition was continued until a slight excess over the theoretical gain in weight had been attained, and the mixture was allowed to stand overnight at room temperature. A very small amount of precipitate was formed. The mixture was then distilled under reduced pressure to yield less than a gram of low boiling liquid, followed by 435 grams of beta-chloropropionitrile, boiling point 91°–93° C., under 41 mm. pressure, a 97.2% yield.

The alpha-alkyl substituted acrylonitriles also react more efficiently with hydrogen chloride in the presence of an amine or an amine salt than if the catalyst is omitted.

Example 5

In a reaction analogous to that of the preceding examples, hydrogen chloride was bubbled into methacrylonitrile at 60°–63° C. in the presence of a diisopropylamine catalyst. The yield of beta-chloroisobutyronitrile was 83.4% as compared to 64.3% when the catalyst was omitted.

While the addition of hydrogen chloride may be made at any temperature at which the alkyl acrylonitrile is liquid, better yields are obtained at room temperature or higher, and a range of 40°–60° C. is preferred. Diisopropylamine is a preferred catalyst.

While the invention has been described with particular reference to specific embodiments, it is to be understood that it is not to be limited thereto but is to be construed broadly and restricted solely by the scope of the appended claims.

I claim:

1. A method of making beta-chloro derivatives of nitriles which comprises reacting a nitrile selected from the group consisting of acrylonitrile and its alpha-alkyl derivatives with hydrogen chloride in the presence of an amine salt.

2. The method of claim 1 wherein the amine salt is a hydrochloride formed in situ.

3. A method of forming beta-chloropropionitrile which comprises reacting acrylonitrile in the presence of an amine salt with hydrogen chloride until the absorption of hydrogen chloride is substantially complete.

4. The method of claim 3 wherein the reaction mixture is maintained at a temperature of 40° C. to 60° C.

5. The method of claim 4 wherein the amine is diisopropylamine.

6. A method of forming beta-chloroisobutyronitrile which comprises reacting methacrylonitrile with hydrogen chloride in the presence of an amine salt until the absorption of hydrogen chloride is substantially complete.

7. The method of claim 6 wherein the reaction mixture is maintained at 40° C. to 60° C.

PHILIP H. MOSS.

REFERENCES CITED

The following references are of record in the file of this patent:

UNITED STATES PATENTS

| Number | Name | Date |
|---|---|---|
| 1,851,040 | Fikentscher et al. | Mar. 29, 1932 |
| 2,434,606 | Carpenter | Jan. 13, 1948 |
| 2,440,801 | Hanford et al. | May 4, 1948 |

OTHER REFERENCES

Moureu et al., Bull. soc. Chim. de France (4), vol. 27, pages 905–906 (1920).

Norris, "Organic Chemistry" (McGraw-Hill), pages 236–237 (1922).

Stewart et al., J. Am. Chem. Soc., vol. 69, pages 713–714 (1947).